(12) United States Patent
Sasidhar et al.

(10) Patent No.: US 11,455,906 B2
(45) Date of Patent: Sep. 27, 2022

(54) SYSTEM AND METHOD FOR IMPROVING PERSONALITY TRAITS

(71) Applicant: DHARMA SYSTEMS INC., Brookline, NH (US)

(72) Inventors: Jonnalagadda Sasidhar, Sleepy Hollow, NY (US); Gowthami Vasudev, Bangalore (IN); Manisha Naresh Nagpal, Bangalore (IN)

(73) Assignee: DHARMA LIFE SCIENCES LLC, Brookline, NH (US)

( * ) Notice: Subject to any disclaimer, the term of this patent is extended or adjusted under 35 U.S.C. 154(b) by 937 days.

(21) Appl. No.: 16/056,124

(22) Filed: Aug. 6, 2018

(65) Prior Publication Data

US 2019/0206276 A1 Jul. 4, 2019

Related U.S. Application Data

(63) Continuation of application No. 14/549,536, filed on Nov. 20, 2014, now abandoned.

(51) Int. Cl.
*G09B 19/00* (2006.01)

(52) U.S. Cl.
CPC .................... *G09B 19/00* (2013.01)

(58) Field of Classification Search
CPC ....................................... G09B 19/00
USPC ......................................... 434/236
See application file for complete search history.

(56) References Cited

U.S. PATENT DOCUMENTS

| | | | |
|---|---|---|---|
| 5,678,571 A | 10/1997 | Brown | |
| 5,828,943 A | 10/1998 | Brown | |
| 5,913,310 A | 6/1999 | Brown | |
| 5,918,603 A | 7/1999 | Brown | |
| 7,294,107 B2 | 11/2007 | Simon et al. | |
| 8,298,087 B1 | 10/2012 | Smith | |
| 9,302,179 B1 | 4/2016 | Merzenich et al. | |
| 9,308,445 B1 | 4/2016 | Merzenich | |
| 9,308,446 B1 | 4/2016 | Merzenich | |
| 9,498,704 B1 | 11/2016 | Cohen et al. | |
| 9,601,026 B1 | 3/2017 | Merzenich | |

(Continued)

FOREIGN PATENT DOCUMENTS

WO 2014117223 A1 8/2014

OTHER PUBLICATIONS

Summons to Oral Proceeding issued Feb. 15, 2021, in EP Application No. 16196761.7, 7 pgs.

(Continued)

*Primary Examiner* — Sibte H Bukhari
(74) *Attorney, Agent, or Firm* — Schwabe Williamson & Wyatt

(57) ABSTRACT

A system for improving personality traits is provided. The system includes at least one processor configured to provide an option to a user for selecting at least one personality trait from a plurality of personality traits. The processor is also configured to suggest at least one alternate personality trait for selection based on the personality trait selected by the user, and allow selection of at least one of the suggested alternate personality traits or proceed with the earlier selection. The processor is further configured to suggest one or more actions based on the personality trait selected by the user, wherein the action is to cause an improvement in the selected personality trait of the user.

14 Claims, 8 Drawing Sheets

(56) References Cited

U.S. PATENT DOCUMENTS

| | | |
|---|---|---|
| 9,764,109 B2 | 9/2017 | Brewer |
| 9,824,602 B2 | 11/2017 | Merzenich |
| 9,886,866 B2 | 2/2018 | Merzenich et al. |
| 9,911,348 B2 | 3/2018 | Merzenich |
| 10,002,544 B2 | 6/2018 | Merzenich |
| 2002/0072040 A1 | 6/2002 | Bajer |
| 2005/0053902 A1 | 3/2005 | Vladimirovich |
| 2005/0192513 A1 | 9/2005 | Darby et al. |
| 2006/0161218 A1 | 7/2006 | Danilov |
| 2006/0184355 A1 | 8/2006 | Ballin et al. |
| 2006/0286519 A1* | 12/2006 | Burnham .......... G09B 7/02 434/236 |
| 2012/0197874 A1 | 8/2012 | Zatkin et al. |
| 2013/0090949 A1 | 4/2013 | Tibebu |
| 2013/0131438 A1 | 5/2013 | Brewer et al. |
| 2014/0479408 | 6/2014 | Ducheneaut et al. |
| 2014/0223462 A1 | 8/2014 | Aimone et al. |
| 2014/0316230 A1 | 10/2014 | Denison et al. |
| 2015/0351655 A1 | 12/2015 | Coleman |
| 2016/0155353 A1 | 6/2016 | Merzenich |
| 2016/0155354 A1 | 6/2016 | Merzenich |
| 2016/0155355 A1 | 6/2016 | Merzenich |
| 2017/0148343 A1 | 5/2017 | Merzenich et al. |
| 2018/0064902 A1 | 3/2018 | Brewer |

OTHER PUBLICATIONS

Amir, N., Beard, C., Burns, M., & Bomyea, J. (2009) Attention modification program in individuals with generalized anxiety disorder. Journal of abnormal psychology, 118(1), 28.

Dennis, TA., O'Toole LJ (2014) Mental Health on the go: Effect of a gamified attention-bias modification mobile application in trait-anxious adults. Clinical Psychological Science. Journals.sagepub.com.

Entis, L. (Jul. 10, 2017). Brain Games Don't Work. Retrieved Mar. 12, 2018, from http://fortune.com/2017/07/10/brain-games-research-lumosity/.

Examination Report from European Patent Application No. 16196761.7 dated Aug. 19, 2020, 5 pgs.

Examination Report from European Patent Application No. 16196761.7 dated Sep. 16, 2019, 6 pgs.

Reducing Anxiety With A Smartphone App. https://www.psychologicalscience.org/news/releases/reducing-anxiety-with-a-smartphone-app.html, published Mar. 18, 2014, 2 pgs.

Stanford Longevity Center. (Oct. 20, 2014). A Consensus on the Brain Training Industry from the . . . Retrieved Mar. 12, 2018 from http://longevity3.stanford.edu/blog/2014/10/15/the-consensus-on-the-brain-training-industry-from-the-.

Williams, J. M. G., Mathews, A., & MacLeod, C. (1996). The emotional Stroop task and psychopathology. Psychological Bulletin, 120(1), 3-24.

EP Communication for Application No. 16196761.7; dated Oct. 8, 2018; 6 pgs.

Ma, Liangsuo, Wang, Binquan, Narayana, Shalini, Hazeltine, Eliot, Chen, Xiying, Robin, Donald A., Fox, Peter T., Xiong, Jinhu; (2010). Changes in regional activity are accompanied with changes in inter-regional connectivity during 4 weeks motor learning. Brain research, 1318, 64-76.

Taubert, M., Draganski, Bogdan, Anwander, Alfred, Muller, Karsten, Horstmann, Annette, Villringer, Arno, Ragert, Patrick; (2010). Dynamic properties of human brain structure: learning-related changes in cortical areas and associated fiber connections. Journal of Neuroscience, 30(35), 11670-11677.

Kuhn, S., Gleich, T., Lorenz, R., Lindenberger, U., Gallinat, J. (2014) Playing Super Mario induces structural brain plasticity: Gray matter changes resulting from training with a commercial video game. Molecular Psychiatry 19, 265-271.

Maguire, Eleanor A., Gadian, David G., Johnsrude, Ingrid S., Good, Catriona D., Ashburner, John, Frackowiak, Richard S.J., Frith, Christopher D.; (1999). Navigation-related Structural change in the hippocampi of taxi drivers. Proceedings of the National Academy of Sciences of the United States of America, vol. 97 No. 8 4398-4403.

Macleod, Colin, Mathews, Andrew, Tata, Philip; (1986) Attentional Bias in Emotional Disorders, Journal of Abnormal Psychology vol. 95, No. 1, 15-20.

Amir, Nader, Beard, Courtney, Cobb, Michelle, Bomyea, Jessica; (2009). Attention modification program in individuals with generalized anxiety disorder. Journal of abnormal psychology, 118(1), 28.

Carlbring, Per, Apelstrand, Maria, Sehlin, Helena, Amir, Nader, Rousseau, Andreas, Hofmann, Stefan, Andersson, Gerhard; (2012) Internet-delivered attention bias modification training in individuals with social anxiety disorder—a double blind randomized controlled trial. BMC Psychiatry 2012 12:66.

Clarke, Patrick JF, Notebaert, Lies; Macleod, Colin; (2014) Absence of evidence or evidence of absence: reflection on therapeutic implementations of attentional bias modification. BMC Psychiatry 2014 14:8.

* cited by examiner

SYSTEM AND METHOD FOR IMPROVING PERSONALITY TRAITS

CROSS-REFERENCE TO RELATED APPLICATIONS

This application is a continuation of U.S. patent application Ser. No. 14/549,536, filed on Nov. 20, 2014, which is hereby incorporated by reference herein in its entirety.

BACKGROUND

Field

The subject matter in general relates to personality traits. More particularly, but not exclusively, the subject matter relates to a technical solution for improving personality traits.

Discussion of Related Art

Human beings have several limitations that may hold them back from achieving their full potential. Some of these limitations relate to limitations in their personality traits, and may be existent by reason of the environment they are subjected to and/or their genes. It is well known that overcoming these limitations may enable one to lead a more rewarding life. Hence, research has been ongoing to find solutions that may enable one to overcome limitations associated with their personality traits.

Conventionally, a person who thinks he has some deficiency in his personality trait may approach a medical professional, who may provide instructions to address the issue. However, the person has to be self motivated to follow all the instructions diligently. Many might lack the required motivation to follow the instructions.

On the other hand, some may be hesitant to discuss issues concerning their personality traits, and hence may not even seek professional help. In such cases, there is a possibility that their condition may deteriorate further.

In many instance one may not seek professional help because they may think that the issue relating to their personality trait may not be serious enough to seek professional help. However, addressing the issues relating to such traits as well might lead to a more rewarding life.

In light of the foregoing discussion, there is a need for a technical solution that may enable a person address issues concerning his personality traits.

SUMMARY

An embodiment provides a system for improving personality traits. The system includes at least one processor configured to provide an option to a user for selecting at least one personality trait from a plurality of personality traits. The processor is also configured to suggest at least one alternate personality trait for selection based on the personality trait selected by the user, and allow selection of at least one of the suggested alternate personality traits or proceed with the earlier selection. The processor is further configured to suggest one or more actions based on the personality trait selected by the user, wherein the action is to cause an improvement in the selected personality trait of the user.

Another embodiment provides a system for improving personality traits. The system includes at least one processor configured to suggest one or more actions to cause an improvement in a personality trait of a user, and determine change in status of the personality trait based on user defined position of a status of the personality trait, actions performed by the user among the suggested actions, effectiveness of the actions performed by the user on the personality trait and deterioration of impact of the actions on the personality trait.

Yet another embodiment provides a method for improving personality traits. The method includes providing a digital scale operable by a user to select a position on the scale, wherein the position is indicative of the user's perception of his character corresponding to the selected personality trait. The method further includes determining a current status of the personality trait at least based on the user selected position on the scale and actions performed by the user, and allowing the user to alter the determined current status of the personality trait. Further, the method includes calibrating future determination of the status of the personality trait based on difference between the determined current status and the status altered by the user.

BRIEF DESCRIPTION OF DRAWINGS

Embodiments are illustrated by way of example and not limitation in the Figures of the accompanying drawings, in which like references indicate similar elements and in which:

FIG. 3A illustrates a user interface 112 that enable a user to enter a search query for selecting a trait he wishes to work on;

DETAILED DESCRIPTION

Figure 1:
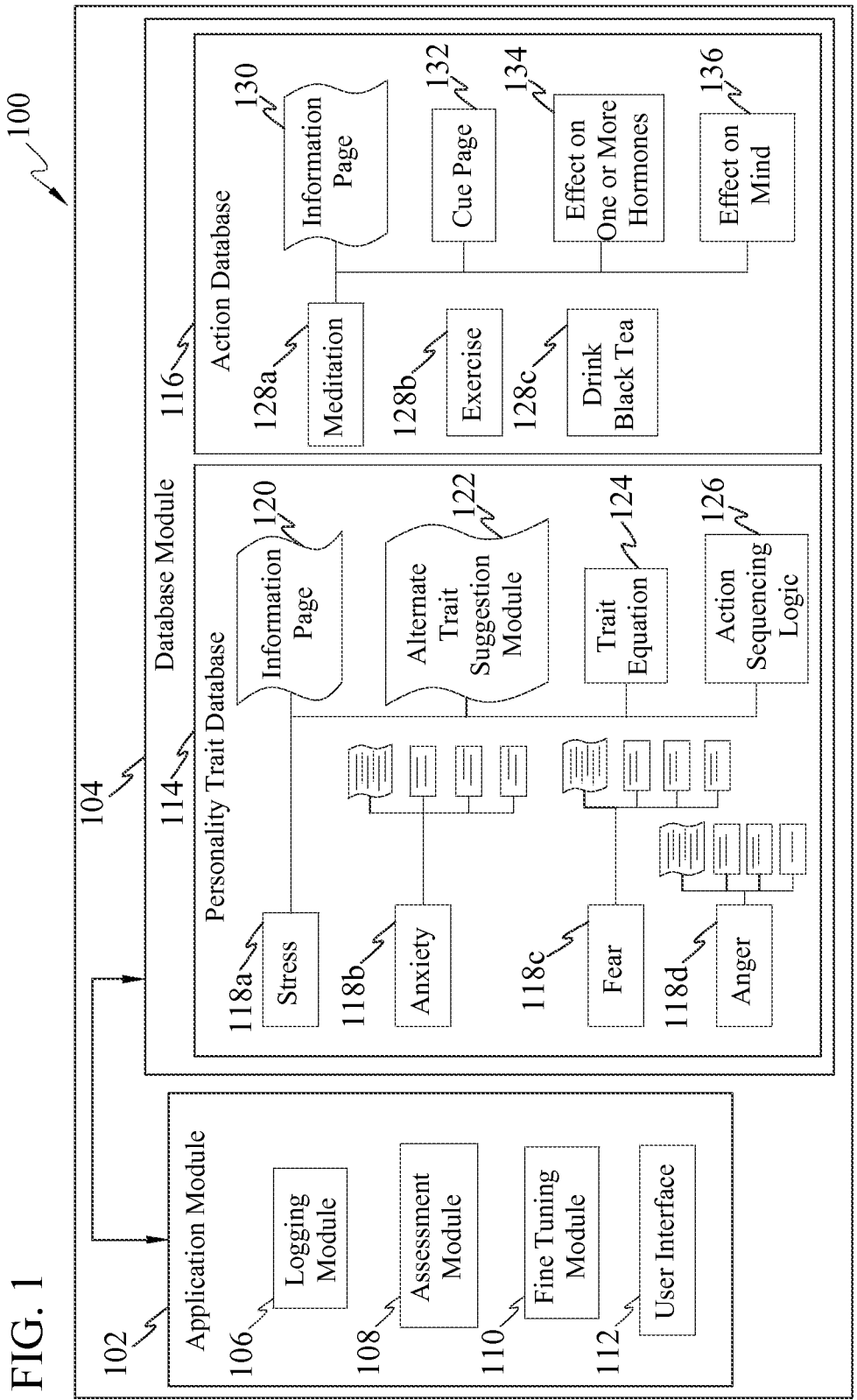
FIG. 1 is a block diagram of a system 100 for improving personality traits, in accordance with an embodiment.

A system and method are provided for improving personality traits. The system may include an application executed by at least one processor configured to provide an option to a user for selecting at least one personality trait from a plurality of personality traits. The personality trait may be a positive trait, or a negative trait. For example, the user may be experiencing a negative trait such as "stress". The user may select "stress" as a personality trait to be improved. The application upon receiving the input from the user, provides information pertaining to "stress". Further, the application may suggest alternate traits for selection. The alternate traits may be "anxiety" and "worry", which may be closely related to or capable of being confused with the initially selected trait "stress". The user may selects at least one of the alternate traits suggested or may proceed with initially selected trait "stress". The application further provides a scale which is operable by the user to select a position on the scale. The position may indicate the user's perception of his character corresponding to the selected trait. The application is further configured to suggest actions to be performed by the user to improve the selected trait. The action suggested may be associated with at least one of a physical action, a mind action, a dietary action and a brain action. The user upon performing an action, may log the action in the application. The application uses the log to determine the status of the selected trait, and may reflect the status on the scale. The application may also consider deterioration of impact of the performed actions on the personality trait to determine the status of the trait, at any instance, and reflect the status on the scale. The application may be further configured to allow a user to alter the position of the status of the trait on the scale, as per his perception. The application may consider the difference between the altered position and the position computed by the application to reconfigure the effectiveness of one or more actions on the trait for future computation of status of the trait.

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description may, therefore, not to be taken as a limiting sense.

In this document, the terms "a" or "an" are used, as is common in patent documents, to include one or more than one. In this document, the term "or" is used to refer to a nonexclusive "or" such that "A or B" includes "A but not B," "B but not A," and "A and B," unless otherwise indicated.

Now referring to the figures, and more specifically to FIG. 1, a system 100 is provided for improving personality traits, in accordance with an embodiment. The system 100 may be hosted by a data processing device, and preferably by a mobile data communication device. Examples of a mobile data communication device include, but are not limited to, smart phone, smart watch, tablet, phablet and laptop, among others. The data processing device may include at least one processor and a memory module, which are used by the system 100. System 100 includes an application module 102 and a database module 104. The application module 102 is executed by the processor, and the database module 104 is stored in the memory module. The application module 102 executed on the processor is configured to communicate with the database module 104 to save or retrieve data using a communication bus.

The application module 102 may include a logging module 106, an assessment module 108, a fine tuning module 110 and a user interface module 112.

The database module 104 may include a personality trait database 114 and an action database 116. The personality trait database 114 may include a list of personality traits, such as stress 118a, anxiety 118b, fear 118c and anger 118d, among others. The personality traits may mean and include one or more human traits and emotional traits. Each personality trait 118 may be associated with an information page 120, an alternate trait suggestion module 122, a trait equation 124 and an action sequencing logic 126.

The information page 120 may include information corresponding to the trait. The information corresponding to the trait may include information corresponding to reasons causing the trait, symptoms corresponding to the trait, impact of the trait on a person and other traits that may be confused with the instant trait, among other information. The information page 120 may even enable selection of an alternate trait to work on instead of the trait to which the information page 120 relates.

The alternate trait suggestion module 122 corresponding to a trait 118 includes a list of one or more traits other than the instant trait 118, which may be selected by a user. Table 1 below provides an exemplary list of traits, and alternative traits for each trait in the list.

TABLE 1

| Traits | Alternate trait |
| --- | --- |
| Pessimism | Depression, Happiness |
| Worry | Anxiety, Stress |
| Empathy | Relationships |
| Depression | Pessimism, Happiness |
| Anxiety | Worry, Sorry Anxiety, Stress |
| Social Anxiety | Anxiety |
| Stress | Anxiety, Worry |
| Anger | Aggression |
| Aggression/Violence | Anger |
| Relationships | Trust, Empathy |
| Submissiveness | Social Anxiety |
| Self Esteem | Depression, social anxiety, submissiveness |
| Self control | Aggression, Anger |
| Trust | Relationships |
| Happiness | Pessimism, Depression |

The trait equation 124 for the trait 118 includes an equation for determining current status of the trait. An exemplary trait equation is provided below:

$$T_V = T_1 + \mathrm{Min}(E_{Hmax}, E_H) + \mathrm{Min}(E_{Mmax}, E_M)$$

$$E_H = h_1 * \frac{H_1}{100} + h_2 * \frac{H_2}{100} + h_3 * \frac{H_3}{100} + \ldots$$

$$E_M = m1\left(\frac{1}{2}\right)^{\frac{t1}{t1half}} + m2\left(\frac{1}{2}\right)^{\frac{t2}{t2half}} + m3\left(\frac{1}{2}\right)^{\frac{t3}{t3half}} + \ldots$$

$$H_1 = a1\left(\frac{1}{2}\right)^{\left(\frac{ta1}{th1half}\right)} + a2\left(\frac{1}{2}\right)^{\left(\frac{ta2}{th1half}\right)} + a3\left(\frac{1}{2}\right)^{\left(\frac{ta3}{th1half}\right)} + \ldots$$

Where,
$T_v$: Current trait value;
$T_1$: User defined trait value;
$E_{Hmax}$: Maximum effectiveness of doing only physical and dietary actions;
$E_{Mmax}$: Maximum effectiveness of doing only mind and brain actions;
$E_H$: Current effectiveness of all physical and dietary actions performed by user;
$E_M$: Current effectiveness of all mind and brain actions performed by user;
h1, h2 and h3 are the weightage for the hormones;
H1, H2 and H3 are the current absolute percentage changes from the normal level of hormones;
a1, a2, a3 are the initial percentage increase of the hormone for its corresponding physical or food action;
ta1, ta2, ta3 are the elapsed time from the time each of the respective actions (a1 a2, a3) was taken;
th1half is the half life or deterioration of the hormone's (H1) effect on the trait;

m1, m2, m3 are the initial percentage improvement in the trait for its corresponding mind action;

t1, t2, t3 are the elapsed time from the time each of the respective actions (m1, m2, m3) was taken; and t1half, t2half, t3half are the half life or deterioration of the actions (m1, m2, m3) effect on the trait The action sequencing logic 126 includes instructions that may enable the application module 102 to suggest one or more actions to be performed to improve the trait 118.

The action database 116 includes a list of actions that may be associated with at least one of a physical action, a mind action, a dietary action and a brain action. Actions, for example can be, meditation 128a, exercise 128b and drinking black tea 128c, among others. An action, such as exercise 128b may be physical actions; meditation 128a may be mind actions; and drinking black tea 128c may be dietary action. Each action 128 may be associated with an information page 130, a cue page 132, effect on one or more hormones 134 and effect on mind corresponding to one or more traits 136, among others.

The action associated with the physical action changes one or more hormone levels. Further while executing the physical action the energy expended in the body is more compared to the energy expended in the brain. Similarly, the action associated with the mind action may involve thinking about the specific trait in a way which may change the structure of the brain by changing the Axons, Receptors and/or the number of Neurons. Actions associated with the brain action may involve exercising the brain, fix example, by way of playing a video game or solving a puzzle, among others. The action associated with the dietary action is adding or deleting specific foods which changes one or more hormone levels.

The information page 130 may include information corresponding to the action 128, such as methodology of performing an action and preparation, among others. The information may be in the form of one or more of text, image, video and audio.

The cue page 132 or an action page may provide information about when and where the action may be performed. The cue page 132 or the action page may further include information about the advantage(s) of performing the action.

Effect on one or more hormones 134 may include values, such as numeric values reflecting the impact of performing the action on one or more hormones. The value(s) may be used in the trait equation. Similarly, effect on mind corresponding to one or more traits 136 may include values, such as numeric values reflecting the impact of performing the action on the mind in relation to one or more trait(s). The value(s) may be used in the trait equation.

The user interface module 112 of the application module 102 is configured to enable a user to interact with the application 102. The user interface 112 allows the user to provide input to the application module 102. Further, the application module 102 provides information and/or instructions to the user via the user interface.

The logging module 106 of the application module 102 enables logging of the actions performed by the user. The logging module 106 includes a list of actions performed by the user and the time of performing the actions.

In an embodiment, the user provides an input that an action has been performed. Such input is used to log the action in the logging module 106. Alternatively, the logging module 106 is configured to automatically log the performance of an action, upon detection that the action has been performed. For example, the application module 102 may provide an action such as solving a quiz. As soon as the quiz is solved or attempted to be solved, the performance of the action may be logged in the logging module 106.

The assessment module 108 of the application module 102 is configured to determine the current status of a selected trait 118. The assessment module 108 uses the information in data in the logging module 106, trait equation 124 corresponding to the trait 118, the effect on one or more hormones 134 and effect on mind corresponding to one or more traits 136 of the actions 128 performed, to determine the current status of the selected trait 118.

The fine tuning module 110 is configured to reconfigure the effectiveness of one or more actions 128 on trait(s) 118 for future computation of status of the trait(s) 118. The reconfiguration may be based on the difference between a user's perception of the status of a trait 118 and the status of the trait 118 as computed by the assessment module 108.

Figure 2:
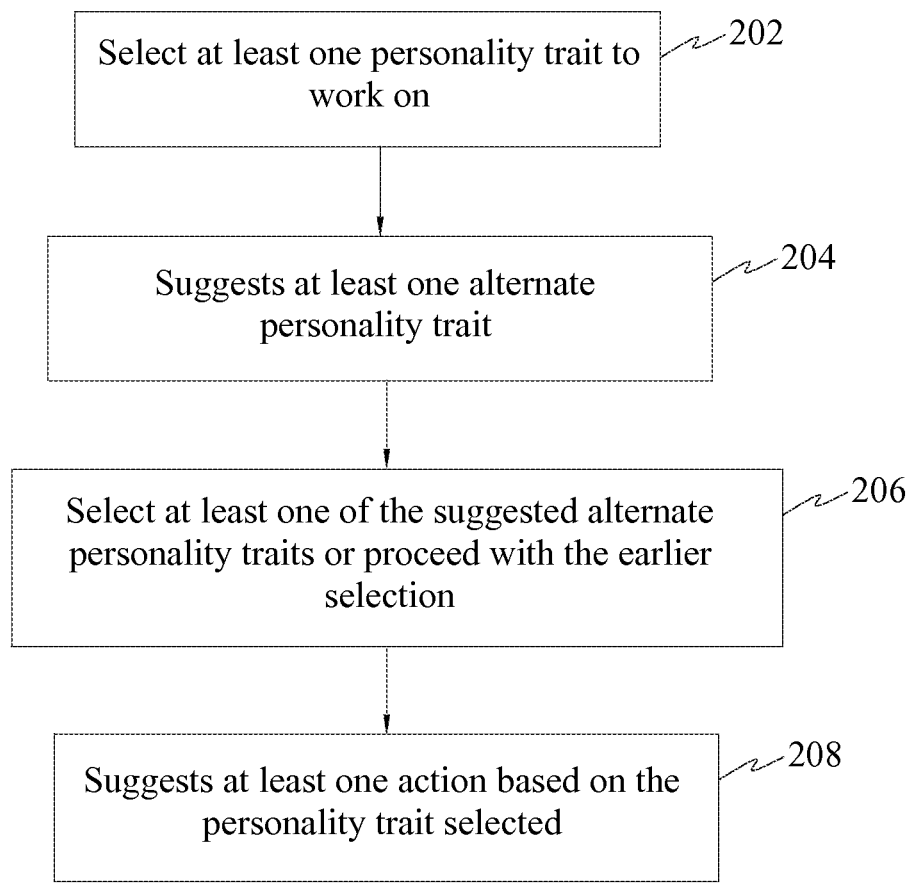
FIG. 2 is flowchart of a method for improving a personality trait, in accordance with an embodiment.
Figure 3A:
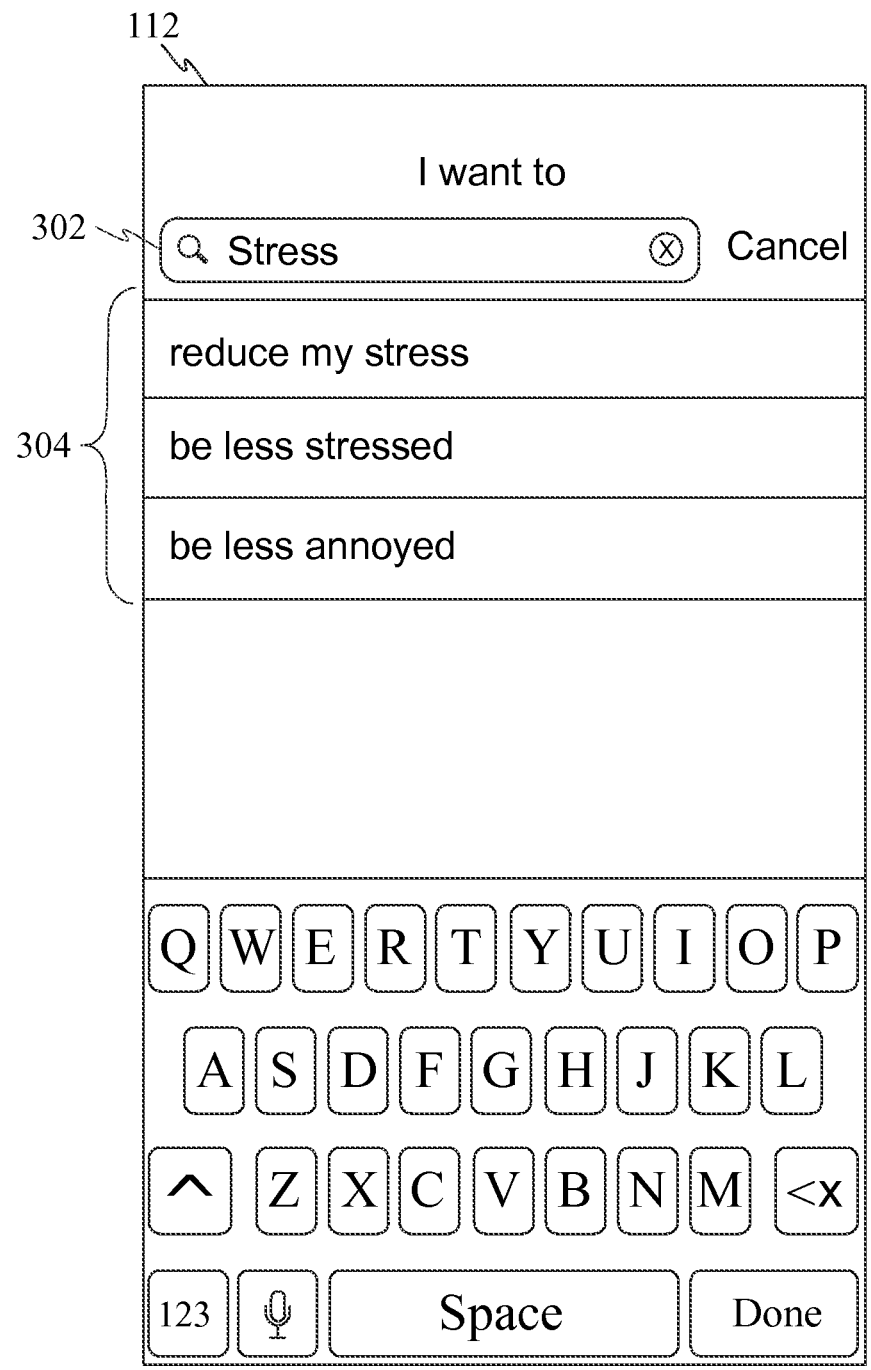
Figure 3B:
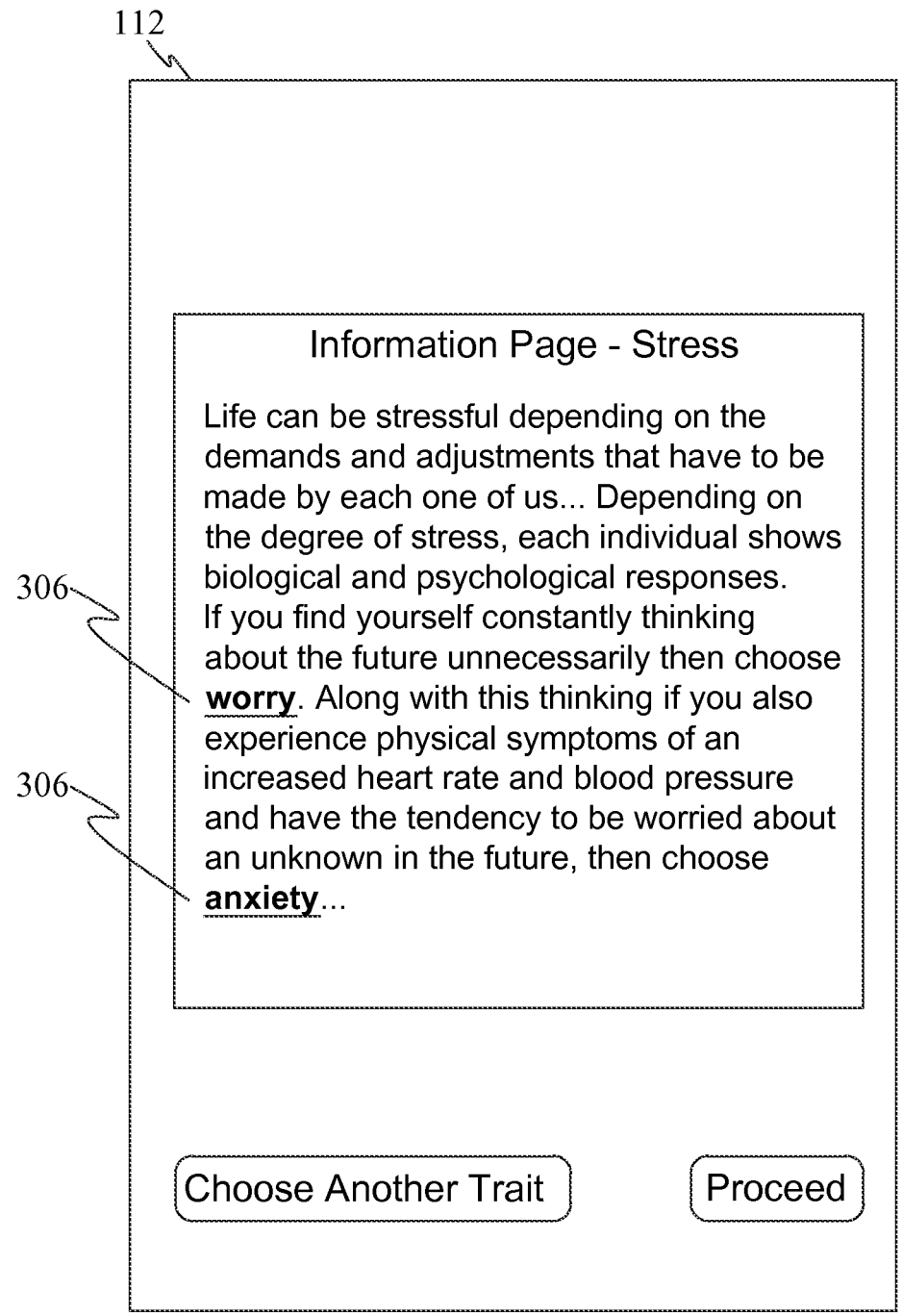
FIG. 3B illustrates a user interface 112 displaying an information page associated with a trait "stress"

Referring to FIG. 2, a method for improving a personality trait 118 is provided, in accordance with an embodiment. At step 202, a user selects a trait 118 to work on. The user interface 112 provides an option to the user for selecting at least one personality trait 118 from the plurality of personality traits 118 present in the personality trait database 114. The personality trait may be something that has existed over a substantial duration, and may have been moulded by reason of his genes and/or environment he is subjected to. For example, fear may be trait that the user wishes to work on, and the instant trait of being fearful may have existed over a substantial span, and may not be something he is experiencing at a particular instance (ex: being afraid upon spotting a tiger). Referring to FIG. 3A, the user interface 112 provides a search box 302 that enable a user to enter a search query for selecting a trait he wishes to work on. A user may provide "stress" as a search query. The user interface 112 upon receiving the query may provide a list of few relevant suggestions 304. The instant figure illustrates a list of exemplary suggestions provided for the query "stress". The suggestions/search results may include "reduce my stress", "be less stressed" and "be less annoyed", among many others. The user may selects a personality trait, such as "stress", by selecting "reduce my stress" presented in the search result 304. Upon selecting the personality trait "reduce my stress", the application module 102 configures the user interface 112 to navigate to an information page 120 associated with the trait 118, which in this example is stress. In FIG. 3B the user interface 112 is displaying an information page 120 associated with the trait 118 "stress". The information corresponding to the trait may include information corresponding to reasons causing the trait, symptoms corresponding to the trait and impact of the trait on a person. At step 204, the application module 102 suggests at least one alternate personality trait for selection based on the personality trait selected by the user. In an embodiment, the information page 120 suggests alternate personality traits 306 that may be related or confused with the instant trait. For example, the alternative personality traits 306 suggested for "stress" may be "anxiety" and "worry". Further, the user interface 112 provides an option to allow selection of at least one of the suggested alternate personality traits "anxiety" or "worry". At step 206, the application module 102 allows selection of at least one of the suggested alternate personality traits or proceeding with the earlier selection. At step 208, the application module 102 suggests at least one action based on the personality trait selected by the user, wherein the action is to cause an improvement in the selected personality trait of the user.

Figure 3C:
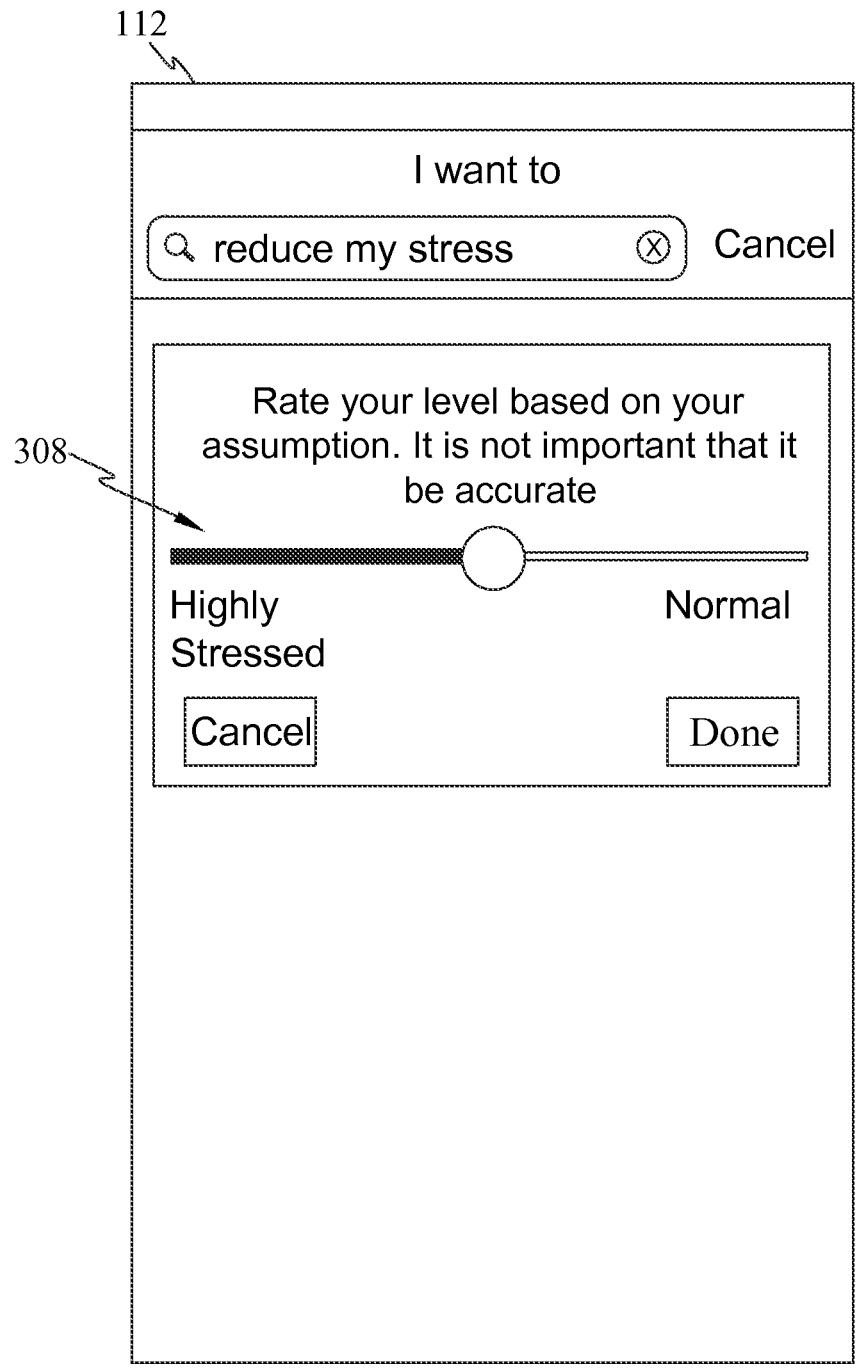
FIG. 3C illustrates a user interface 112 displaying a scale 308 that is operable by a user to select a position on the scale 308 indicative of the user's perception of his character corresponding to a selected personality trait "stress"

In an embodiment, upon selecting a personality trait at step 206, the application module 102 provides a scale operable by the user to select a position on the scale. The position may be indicative of the user's perception of his character corresponding to the selected personality trait. Referring to FIG. 3C, the user interface 112 displays a scale 308 that is operable by the user to select a position on the scale 308 indicative of the user's perception of his character corresponding to the selected personality trait "stress".

Figure 3D:
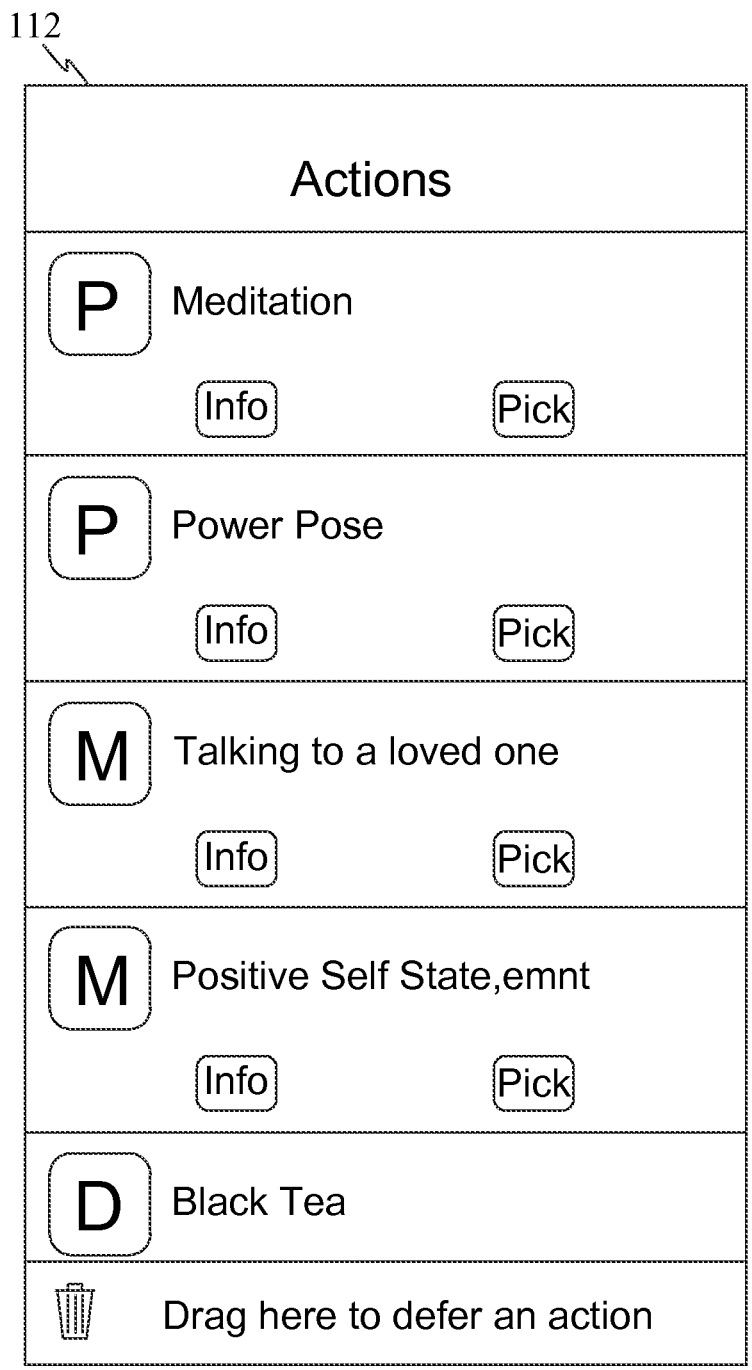
FIG. 3D illustrates a user interface 112 displaying a list of actions 310 to choose from to reduce stress.

As recited earlier, the application module 102 suggests at least one action based on the personality trait selected by the user, wherein the action is to cause an improvement in the selected personality trait of the user. Referring to FIG. 3D, the user interface 112 is displaying a list of actions to choose from to reduce stress. In this example, the actions suggested by the application module 102 for stress reduction are meditation, power pose, talking to a loved one, positive self and black tea. Each of the action suggested may be associated with at least one of physical action 'P', brain action mind action 'M' and dietary action 'D'. The application module 102 suggests the actions based on the action sequencing logic 126 associated with the selected trait. The action sequencing logic 126 may includes instructions to suggest actions based on one or more criteria, such as, but not limited to, simplicity of performing each of the actions, effectiveness of each of the actions in changing the status of the selected personality trait, trait equation 124 associated with the selected trait, status of the selected trait and the actions which have been previously executed by the user.

The user interface 112 allows the user to select one or more of the suggested actions. In an embodiment, the application module 102 enforces restriction on the type of actions that the user may select. The restriction may be based on previously selected/performed actions and the type of action that may have to be performed, based on the trait equation 124, to improve the selected trait. Further, the restriction may be at least based on effect of hormones on the personality trait and effect of mind on the personality trait, which is also reflected in the trait equation 124.

In an embodiment, the user is provided with an option to defer the suggested action in the user interface 112. The application module 102 upon receiving the decision to defer an action that is suggested, the application module 102 retrieves at least one alternative action to be suggested for the user to improve the status of the selected personality trait.

Figure 3E:
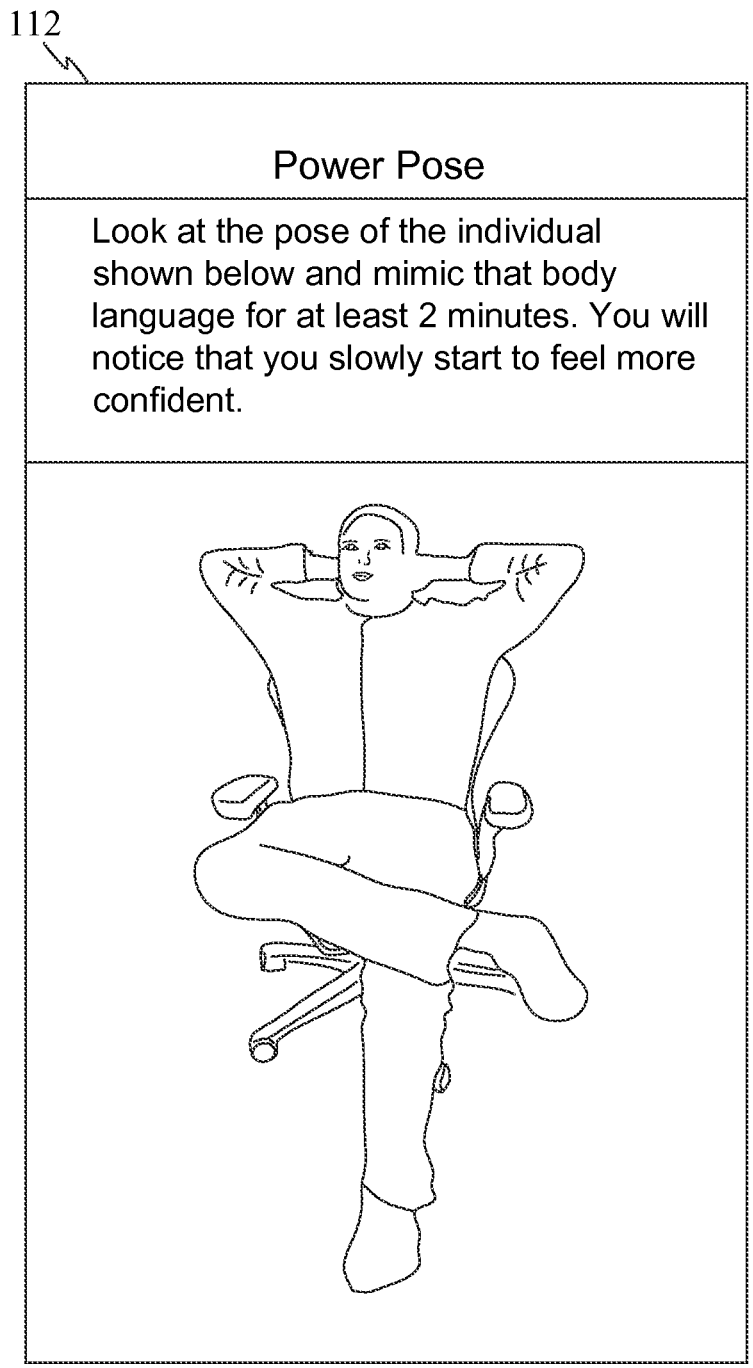
FIG. 3E illustrates a user interface 112 displaying an information page associated with an action "power pose"

The application module 202 configures the user interface 112 to display all the selected actions that have to be performed. The user interface 112 may be configured to allow a user to access the information page 130 associated with each of the actions. Referring to FIG. 3E, the user interface 112 is displaying an information page 130 associated with the action "power pose". Additionally, the application module 102 may provide motivational information associated with each of the actions.

The user interface 112 may be further configured to allow the user to prepare a schedule for preforming each of the actions, access the cue page 132 associated with each of the actions, and log the performance of each of the actions, which is logged in the logging module 106.

Figure 4:
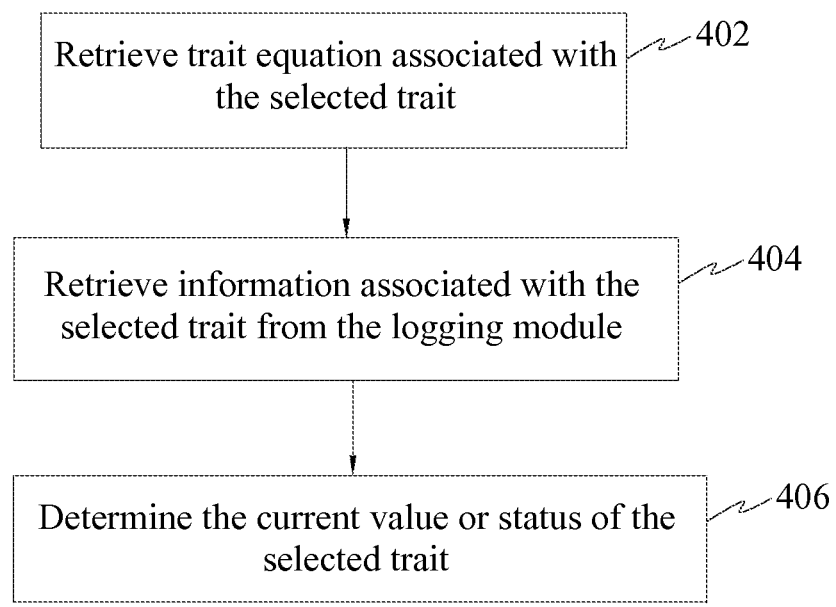
FIG. 4 is a flow chart of a method for determining status of a selected trait, in accordance with an embodiment.

Referring to FIG. 4, a method for determining status of a selected trait is provided, in accordance with an embodiment. At step 402, the application module 102 retrieves the trait equation 124 associated with the selected trait. Further, at step 404, the application module 102 retrieves information associated with the selected trait from the logging module 106. The information retrieved from the logging module may include initial or user defined value of the selected trait, actions performed by the user and the time of performing each of the actions. Additionally, at step 406, the application module 102 applies the trait equation 124 to determine the current value or status of the selected trait. The status or current value may be reflected on the scale.

In an embodiment the application module 102 enables a user to modify or alter a position indicating status of a trait on the scale, from a position determined by the assessment module 108. The application module 102 calibrates future computation of status of traits based on the difference between the application module 102 determined position and the user altered position.

It shall be noted that the processes described above is described as sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A system, comprising:
a general purpose digital processor; and
a memory storing instructions executable by the general purpose digital processor to transform the general purpose digital processor into an instrument for assessing a current level of a personality trait of a person, wherein the instructions, when executed by the general purpose digital processor, are operable to identify, from an input, information about an original assessment of the personality trait of the person, wherein the original assessment is indicative of an original level of the personality trait of the person;
wherein the system further includes one or more data stores to retain one or more predefined sets of values corresponding to one or more action definitions, respectively, wherein each predefined set of values includes:
one or more pairs of values for one or more traits, respectively, each pair of values indicative of a predicted impact of an action associated with a corresponding one of the one or more action definitions on a corresponding trait of the one or more traits, wherein each pair of values includes a weightage and an indication of whether to assign the weightage for a hormone or brain neural structure; and
one or more deterioration values for the one or more traits, respectively, each deterioration value indicative of a predicted loss of impact over time associated with the corresponding action on the corresponding trait of the one or more traits, wherein each deterioration value includes a half life of a corresponding one of either the hormone's effect on the corresponding trait or the brain neural structure's effect on the corresponding trait;

wherein the instructions, when executed by the general purpose digital processor, are further operable to deterministically modify a value associated with the original assessment using information taken from the one or more data stores to provide an updated assessment of the personality trait of the person, including:

identifying one or more actions that are performed by the person and corresponding to at least one of the one or more action definitions, the one or more actions performed by the person following a first time corresponding to the original assessment value, said identifying the one or more actions including identifying at least one elapsed time value, wherein each elapsed time value is indicative of an amount of time between a second time corresponding to performance of an action of the identified one or more actions and a third time corresponding to the updated assessment;

selecting from the one or more predefined sets of values based on the identified one or more actions, wherein the selected predefined set(s) of values include at least one of the pairs of values and at least one deterioration value;

generating the updated assessment of the personality trait of the person based on the at least one pair of values, the at least one deterioration value, and the at least one elapsed time value; and outputting the updated assessment of the personality trait of the person for display to the person.

2. The system according to claim 1, wherein each of the one or more action definitions is associated with at least one of a physical action, a mind action, a dietary action and a brain action.

3. The system according to claim 1, wherein the one or more second times are taken from an action log.

4. The system of claim 1, wherein the instructions, when executed by the general purpose digital processor, are further operable to cause controls to be displayed for selection, by the person, from a plurality of personality traits, wherein the personality trait is identified based on a user input received by the controls.

5. The system of claim 4, wherein the instrument is configured to suggest that the person perform at least one action in response to receipt of the user input by the controls, wherein the suggested at least one action corresponds to one of the one or more action definitions.

6. The system of claim 5, wherein the suggested at least one action includes a video game exercise.

7. The system of claim 5, wherein the instructions, when executed by the general purpose digital processor, are further operable to collect information about the one or more second times to form a log of the one or more actions from the collected information, wherein identifying one or more actions that are performed by the person and corresponding to at least one of the action definitions comprises accessing the log.

8. The system of claim 7, wherein the instrument is configured to display a scale for the personality trait, wherein displaying the updated assessment of the personality trait of the person includes displaying a marking for the updated assessment on the scale.

9. The system according to claim 8, wherein the instrument is configured to select the at least one suggested action based on data of one of the predefined set(s) of values that corresponds to the personality trait or additional data about simplicity of performance.

10. The system according to claim 8, wherein the marking further comprises a first marking, and wherein the instrument is further configured to display a second marking on the scale for the original assessment, wherein the first and second markings are contemporaneously displayed.

11. The system of claim 1, wherein the instrument is configured to generate the original assessment.

12. The system of claim 11, wherein the instrument is configured to generate the original assessment using information collected via a graphical user interface.

13. The system of claim 12, wherein the graphical user interface includes a scale and a control to allow the person to select a position on the scale to indicate the original assessment.

14. The system of claim 13, wherein the control comprises a slider.

* * * * *